Oct. 30, 1945. R. MAYNE 2,387,802
SEPARABLE TRACK FOR CRAWLER TYPE VEHICLES
Filed Sept. 20, 1941 2 Sheets-Sheet 1
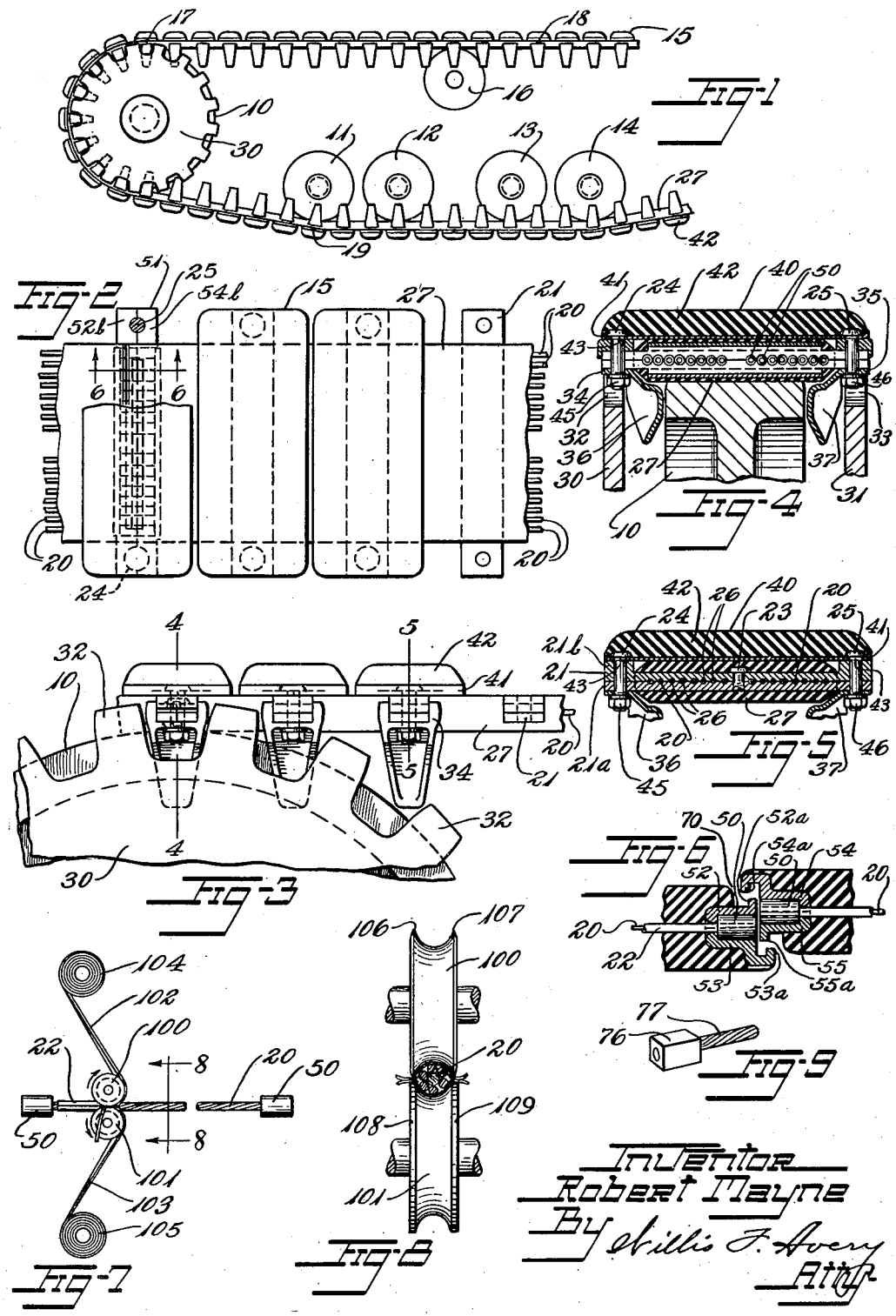
Inventor
Robert Mayne
By Willis F. Avery
Atty.

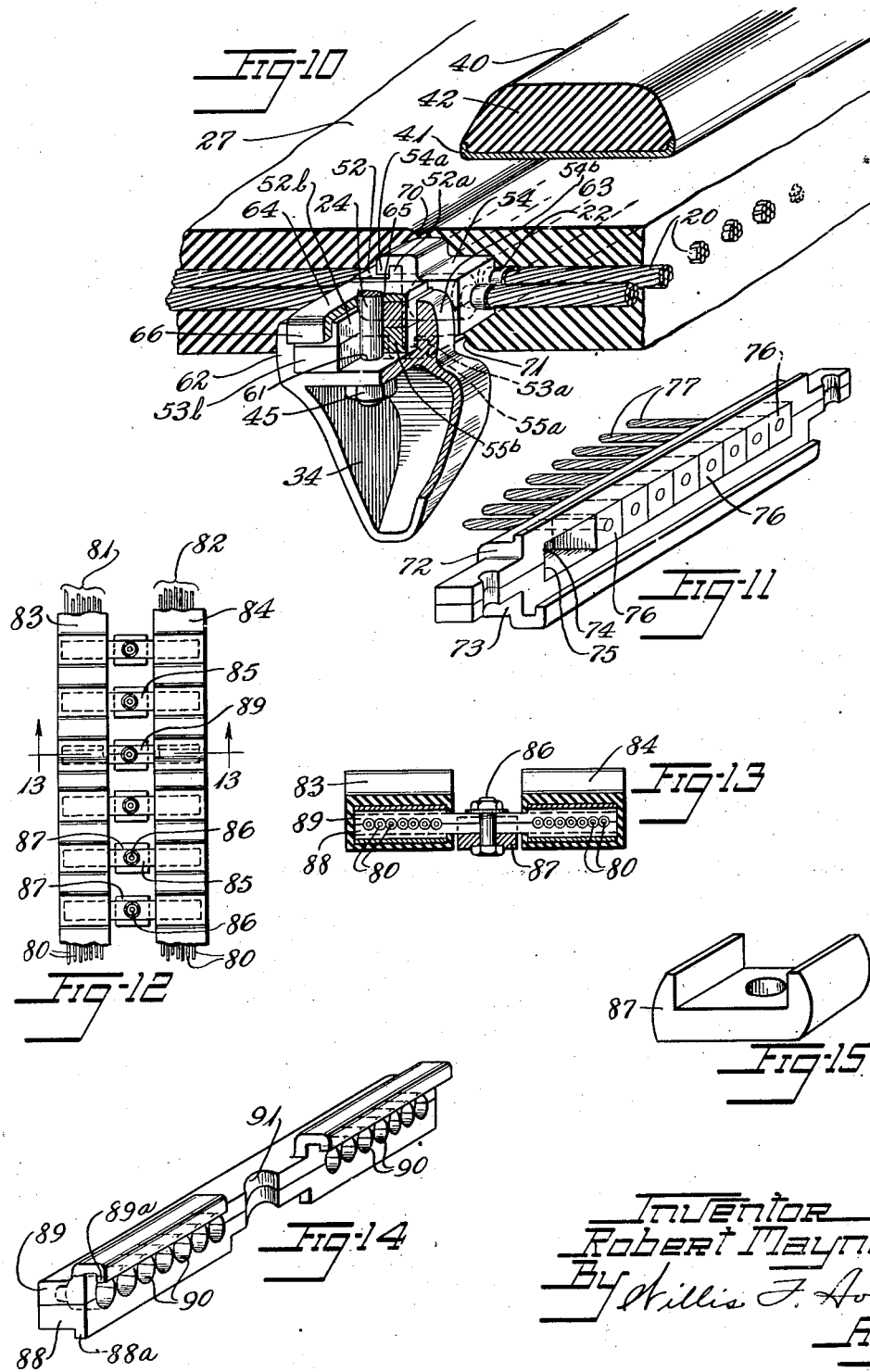

Patented Oct. 30, 1945

2,387,802

UNITED STATES PATENT OFFICE 2,387,802

SEPARABLE TRACK FOR CRAWLER TYPE VEHICLES

Robert Mayne, Akron, Ohio, assignor to The B. F. Goodrich Company, New York, N. Y., a corporation of New York Application September 20, 1941, Serial No. 411,673

13 Claims. (Cl. 305—10)

This invention relates to separable track for crawler type vehicles and is especially useful where it is necessary to remove or replace the track or sections thereof.

When vehicles such as tractors, trucks, or tanks are to be used over unimproved terrain it has been proposed to provide them with driving and supporting means of the self-laying track or crawler type in which an endless track or belt contacts the ground and the vehicle is supported therefrom by bogie wheels while power is transmitted to the track by sprockets or other driving means attached to the vehicles. It is often desirable to remove and replace the track in the field and where the track becomes damaged in part only, it is desirable to provide for replacement of damaged or worn sections thereof.

The present invention aims to overcome these difficulties and to provide an improved track.

The principal objects of the invention are to provide a separable track, to provide interchangeable track sections, to facilitate replacement and repair, to provide strength and durability of structure, to provide effectively uniform flexibility, and to provide for convenience and economy of manufacture and ease of assembly and disassembly.

These and other objects will appear from the following description and the accompanying drawings.

Of the drawings:

Fig. 1 is a side elevation of a vehicle drive embodying the invention, parts being broken away.

Fig. 2 is a plan view of the tread face of a portion of the track of Fig. 1, showing a separable connection, parts being broken away.

Fig. 3 is a side elevation to a larger scale showing a portion of the track and a portion of a drive wheel, other parts being broken away.

Fig. 4 is a sectional detail view at a separable connection, taken along the line 4—4 of Fig. 3, parts being broken away.

Fig. 5 is a sectional view of the track taken along the line 5—5 of Fig. 3, parts being broken away.

Fig. 6 is a sectional detail view taken along the line 6—6 of Fig. 2 but showing the connector elements as separated.

Fig. 7 is a diagrammatic view of cable covering mechanism, illustrating a manner of covering the cables.

Fig. 8 is a section taken along the line 8—8 of Fig. 7.

Fig. 9 is a perspective view of a modification of the cable end.

Fig. 10 is a perspective view of the track of Fig. 1, with part of the rubber broken away to show the coupling members and cables, portions of the metal parts also being broken away and shown in section.

Fig. 11 is a perspective view of a pair of driving bar members comprising a connecting member of modified construction.

Fig. 12 is a plan view of a portion of track of a modified form having center driving.

Fig. 13 is a section thereof taken on line 13—13 of Fig. 12.

Fig. 14 is a perspective view of a coupling member used in the modified construction of Fig. 12.

Fig. 15 is a perspective view of the wear plate of Fig. 12.

The invention is illustrated as incorporated in a track comprising a plurality of laterally spaced-apart flexible tension elements, such as metal cables, covered with rubber-like material, are held in the laterally spaced-apart relation by longitudinally spaced-apart driving bars extending across the cables and secured to the cables in drive-transmitting relation by intervening rubber-like material in vulcanized adhesion with the cables and bars. In accordance with the invention, the track is made separable at one or more of the driving bars by providing coupled bar sections in which the cable ends are anchored. The sections, where more than one track sections are employed, are interchangeable with each other as to their connecting bar sections to provide for ready replacement in the field or for quick repair.

Referring to the drawings, the numeral 10 designates a drive wheel of a self-laying track or crawler type vehicle, and the numerals 11, 12, 13, 14 designates bogie wheels for supporting the vehicle from a track 15. The numeral 16 indicates a guide wheel engaging the upper reach of the track.

The track may be of one or more sections joined to each other, end to end, as at 17, 18, 19, as hereinafter described. Each track section comprises a plurality of laterally spaced-apart reaches 20 of metallic cable extending longitudinally thereof and held in spaced-apart relation by driving bars 21. The cables are each enclosed by a sheath 22 of rubber or other rubber-like cushioning material, and the driving bars are each formed of separable bar members 21a, 21b held together by bolts 23, 24, 25. The driving bar members have spaced-apart half-round grooves 26 in their meeting faces, larger in radius than the cables, adapted to enclose the cables and their cushion coverings, the rubber-like material being bonded by vulcanization to the bars and cables to transmit driving stresses by shear stress in the rubber-like material. The assembled cables and driving bars are enclosed by a body 27 of rubber or other rubber-like cushioning material molded thereabout so that only the ends of the driving bars engaged by the bolts 24, 25 are exposed.

The inner face of the cushion body 27 rides directly on the face of the driving wheel 10 and the guide and bogie wheels, thereby providing quiet operation and protecting the cables and driving bars from abrasion.

Sprocket wheels 30, 31 for driving the track are mounted flanking the drive wheel 10 and their sprocket teeth 32, 33 project therebeyond so as to engage the ends of the driving bars. For protecting the ends of the driving bars from wear, to provide for guiding the track, and to provide for replacement of the driving and guiding means, wear shoes 34, 35 are mounted over the ends of the driving bars and are formed with integral guide flanges 36, 37 adapted to engage the sides of the drive wheel 10. These wear shoes are secured by the bolts 24, 25, heretofore mentioned, which pass therethrough and may be readily replaced by removal of these bolts.

To provide for replacement of the wear surface of the track and for additional cushioning thereof and traction, replaceable tread members 40 are secured to the body of the track by the bolts 24, 25. These tread members each comprise a metal plate 41 and a tread block 42 of rubber or other rubber-like material secured thereto by vulcanization. The plates 41 are perforated to admit the bolts 24, 25 which are prevented from turning with respect to the plates and have their heads embedded in the resilient material of the blocks. Preferably the bolts are formed with squared shoulders 43 which engage in square openings in the plates. By removing the nuts 45, 46, the tread members may be individually removed. The wear shoes 34, 35 are released by this operation and may be replaced if necessary at the same time.

To provide for replacing damaged portions of the track, the track may be constructed in a plurality of sections joined end to end, or, optionally, for ready removal of the track the track may be made in a single section having connecting means at its ends. A convenient coupling means for accomplishing these purposes is provided in the following manner:

The cables 20, heretofore described, are made equal in length to the desired section and a ferrule 50 is secured over each end of each cable. These ferrules are, in the preferred form, cylindrical metal bushings which may be slipped over the cable and swaged or otherwise reduced in dimensions so as to grip the metal cable. If desired, they may be welded or brazed to the cable. Driving bars 51, corresponding in function to the driving bars 21, heretofore described, as to providing driving means for the track and securing means for the guide flanges and tread members, but having the additional functions of securing track ends to each other and anchoring the cable ends, are provided at the ends of the sections. These driving bars 51 each comprise four driving bar members 52, 53, 54, 55. Members 52, 53 are separable on a plane parallel to and passing through the axes of the cables and are formed with half-round spaced-apart cavities complementary to each other for enclosing the ferrules 50 and the cables extending therefrom. The members 54, 55 are similarly separable from each other along a plane parallel to the axis of the cables and are similarly formed with complementary cavities for retaining the ferrules of the cables of the next section. Members 52 and 55 are formed with outwardly directed flanges 52a and 55a and members 53 and 54 are formed with reflexed inwardly directed flanges 53a, 54a spaced from the bodies of the members by a thickness equal to the thickness of flanges 52a, 55a. The arrangement is such that when the four members are assembled members 52 and 53 together form a coupling member which interlocks with the members 54, 55 acting as a second coupling member, with flanges 53a and 54a engaged over flanges 52a, 55a and the cables in the sections in alignment with relation to each other. The coupling members so formed may be separated by movement relative to each other in a direction perpendicular to the plane of the cables but cannot be separated by a pull in the direction of the cables.

The ends of the members 52, 53, 54, 55 extend at the sides of the track as flattened ends 52b, 53b, 54b, 55b, which in assembled relation equal in dimensions the ends of the bars 21 and are held in assembled relation by bolts 24, 25, the openings for receiving said bolts being formed by half round notches in the edges of the bar members 52, 53, 54, 55 so that the bolts when inserted prevent relative endwise movement of these members. A track guide 34 or 35 is mounted on each end of the bar members and has an opening 61 for receiving the bolt 24, and a pair of side flanges 62, 63 defining a rectangular notch which engages the ends of the bar members and assists in holding them in assembled relation as well as preventing the guide flange from turning around the bolt. A washer 64, preferably rectangular, engages over the bar members 52, 54 and has a centered opening 65 engaging over the bolt and a flange 66 turned downwardly over the ends of bar members 52, 54 to prevent its rotation about the bolt and to assist in holding the bar ends in place. The arrangement is such that the bar ends are substantially confined in all directions against spreading. The flanges 62, 63 also provide wear shoes, as described above, for engaging the drive sprockets. One of the tread plates 41 is fixed to the bolt 24 and is clamped directly upon the washer 64, a nut 45 being threaded on the bolt and engaging the guide member 34 for holding the parts in assembled relation.

The rubber body 27 which encloses the cables and driving bars, and is vulcanized thereto, is divided, as at 70 adjacent the flange 54a and at 71 adjacent the flange 53a to permit separation of the coupling members from each other by relative movement perpendicular to the track face when the bolts 24, 25 are removed, as shown in Fig. 6.

By providing a plurality of sets of coupling members in a single track, the track may be made in sections which may be individually removed and replaced when damaged or worn, the coupling members being made interchangeable. Such a construction also facilitates construction as the sections may be assembled for short lengths of cable and the rubber may be molded in a flat pressing operation.

All metal parts are preferably bonded to the rubber-like material during vulcanization and for this purpose may be electroplated with brass or other rubber-adherent metal or otherwise treated to promote bonding of the cushioning material thereto.

In the modification illustrated in Figs. 9 and 11, the bar members 72, 73 are formed with rectangular rebates 74, 75 which, when the members are assembled face to face, as illustrated in Fig. 11 define a mortise, and the ferrules 76 attached to the cables 77 are of rectangular cross-section and are assembled in side by side relation in the mortise. This construction prevents turning of the cables.

The invention is shown in Figs. 12 to 15 as embodied in a track of the center-drive type. Referring to these drawings, the cables 80 are arranged in two groups 81, 82 spaced apart from each other and each enclosed by bodies 83, 84 of wear-resisting cushion rubber. Driving bars 85 are secured to the cables at spaced apart intervals. These bars, like the bars 21 are formed of complementary bar members having spaced apart half-round grooves for receiving the cables. A bolt 86 passes through the bar members and through a sprocket engaging wear plate 87 for holding them in assembled relation. Wear plates 87 are of U-shape so as to embrace the side edges of the bar members and to provide upstanding driving surfaces. Guiding flanges may be included, for example, as disclosed in Mayne Patent No. 2,107,490.

At the splice positions parts 88, 89 of driving and connecting bars are provided. One of these bars 89 has an inwardly projecting flange 89a and the other member 88 has an outwardly directed flange 88a adapted to engage complementary flanges of similar bar members attached to an adjoining track section as in the form illustrated in Figs. 1 to 6. These flanges are provided however only at the ends of the bar members, the centers of the bar members between the rubber bodies 83, 84 being flattened and reduced in dimensions as seen in Fig. 14. Sockets 90 are formed between the bar members to receive ferrules fixed to the ends of the cables. The pairs of bar members are assembled about the cable ends and embedded in the rubber with their coupling flanges exposed. The central parts of the bars where they span the space between the rubber bodies 83, 84 are formed with half round grooves 91 which cooperate with similar grooves of the bar members on the adjoining section to provide an aperture for receiving the locking bolt 86. The track section ends may be coupled by relative movement in a direction perpendicular to the tread face of the track as with the forms of the invention previously described. The wear plate 87 is then assembled about the bar members and the bolt 86 is inserted and secured in its opening. In uncoupling the sections, the bolt is removed and also the wear plate, whereupon the ends of the track may be moved relative to each other to uncouple the flanges.

Referring to Figs. 7 and 8, where cables 20 have been cut to length and ferrules 50 have been fixed to their opposite ends, the rubber covering 22 is applied over the cables by feeding them between rollers 100, 101 having grooves of half round cross-section in their faces. Strips 102, 103 of unvulcanized rubber are drawn from supply rolls 104, 105 and about rolls 100, 101 into engagement with the surface of the cable. Any excess material is trimmed away and the strips are seamed to each other by annular cutting and seaming edges 106, 107 on roller 100 which cooperate with flattened edges 108, 109 of the roller 101 in seaming and cutting the rubber strips to provide a tubular rubber covering 22.

Variations may be made without departing from the scope of the invention as it is defined by the following claims:

I claim:

1. A separable self-laying track comprising a substantially continuously flexible body having an end adapted for detachable connection, said body comprising rubber-like material, a flexible tension structure embedded in said material and adhered thereto, and a connecting bar to which said tension structure is secured at an end of said body, said connecting bar including recessed coupling means providing a shoulder separably engageable with a cooperating shoulder on another connecting bar only by relative movement of the connecting bars in a direction substantially normal to the tread face of the track.

2. A separable self-laying track comprising a substantially continuously flexible body having ends adapted for detachable connection, said body comprising rubber-like material, a flexible tension structure embedded in said material and secured thereto by vulcanized adhesion, a plurality of cross bars at spaced-apart positions along the body and connected to said tension structure in drive-transmitting relation solely by intervening rubber-like material in vulcanized adhesion with said bars and structure, and connecting bars to which said structure is secured at the ends of said body, said connecting bars being directly engageable with each other by relative movement in a direction substantially normal to the tread face of the track.

3. A separable self-laying track comprising a substantially continuously flexible body having ends adapted for detachable connection, said body comprising rubber-like material, flexible cable elements embedded in said material and secured thereto by vulcanized adhesion, a plurality of cross bars at spaced-apart positions along said cable elements and connected to them in drive-transmitting relation solely by intervening rubber-like material in vulcanized adhesion with said bars and elements, and connecting bars to which said cable elements are secured at the ends of said body, said connecting bars being directly engageable with each other by relative movement in a direction substantially normal to the tread face of the track.

4. A separable self-laying track comprising separable sections, each section comprising longitudinal cable elements, cross bars secured at intervals to the cable elements, coupling bars separable perpendicularly of the track and attached to the cable elements at the end of the section, said coupling bars having interengaging tongue and groove elements, and a body of rubber-like material surrounding said cable elements and at least portions of said cross bars and coupling bars.

5. A track section for a separable self-laying track, said section comprising end coupling members, longitudinal cable elements extending from one coupling member to another, and anchoring means attached to the ends of the cable elements and adapted to engage said coupling members, said coupling members each comprising separable bars having complementary notches for receiving said cable elements, means for holding said bars in cable-engaging relation, and means on said bars for engaging over cooperating means on an adjoining coupling member by relative movement in a direction perpendicular to the tread face of the track to hold the members in coupled relation.

6. A self-laying track comprising longitudinal cable elements, a body of rubber-like material surrounding said cables and attached thereto by vulcanization, and coupling means attached to the ends of the cables, said coupling means comprising ferrules attached to the ends of the cables, complementary bars assembled about said ferrules, means on said bars for removably engaging similar bars of an adjoining coupling member, means for enclosing the ends of the bars of engaged coupling members, and means for securing said last-named means to said bars.

7. A self-laying track comprising longitudinal cable elements, cross-bars attached at intervals to the cable elements solely by intervening rubber-like material in vulcanized adhesion with the cable elements and bars, a body of rubber-like material surrounding said cable elements and attached thereto and to the bars by vulcanization, coupling means attached to the ends of the cable elements, and track guiding means attached to said bars and said coupling members, said guiding means comprising members embracing said bars and coupling members, and locking means for securing them in place; the guiding means attached to said coupling means being effective to hold the coupling means in coupled relation.

8. A self-laying track comprising longitudinal cable elements, cross-bars attached at intervals to the cables solely by intervening rubber-like material in vulcanized adhesion with the cable elements and bars, a body of rubber-like material surrounding said cable elements and attached thereto and to the bars by vulcanization, coupling means attached to the ends of the cable elements, and sprocket engaging wear plates attached to said bars and said coupling members, said wear plates comprising members embracing said bars and coupling members, locking means for securing them in embraced relation about said bars and coupling members, and guiding means for aligning the track with driving and guiding wheels.

9. A coupling member for separable self-laying track having longitudinal cables, a coupling comprising a pair of complementary elements extending across the track and adapted to be secured about the ends of the cables, a tongue on one of said elements and a groove on the other element adapted to engage complementary groove and tongue formations on an adjoining coupling member by movement substantially perpendicularly to the plane of the cables, and means for locking the coupling members with the adjacent member.

10. A coupling member for separable self-laying track having longitudinal cables, a coupling member comprising a pair of complementary elements extending across the track and adapted to be secured about the ends of the cables, a tongue on one of said elements and a groove on the other element adapted to engage complementary groove and tongue formations on an adjoining coupling member by movement substantially perpendicularly to the plane of the cables, and means for locking the coupling members with the adjacent member, said means comprising a U-shaped member engageable over the coupling members, and means for holding the U-shaped members and the coupling members in assembled relation.

11. A coupling member for separable self-laying track having longitudinal cables, a coupling member comprising a pair of complementary elements extending across the track and adapted to be secured about the ends of the cables, a tongue on one of said elements and a groove on the other element adapted to engage complementary groove and tongue formations on an adjoining coupling member by movement substantially perpendicularly to the plane of the cables, and means for locking the coupling members with the adjacent member, said means comprising a sprocket-engaging member having a mortise for receiving both coupling members, and means for retaining said coupling member in said mortise.

12. A coupling member for separable self-laying track having longitudinal cables, a coupling member comprising a pair of complementary elements extending across the track and adapted to be secured about the ends of the cables, a tongue on one of said elements and a groove on the other element adapted to engage complementary groove and tongue formations on an adjoining coupling member by movement substantially perpendicularly to the plane of the cables, and means for locking the coupling members with the adjacent member, said means comprising a member having a mortise for receiving both coupling members and a bolt extending through said mortise between notches formed in said coupling members.

13. A coupling member for separable self-laying track having longitudinal cables with enlarged ends, said coupling member comprising a pair of complementary bar elements extending across the track and having notches formed in their meeting faces for receiving the enlarged ends of said cables, means for holding said elements in assembled relation about said cables, means on said elements for engaging an adjoining coupling member by relative movement in a direction substantially perpendicularly to the plane to the cables, and means for receiving said coupling members against such relative movement.

ROBERT MAYNE.